Nov. 8, 1955    R. E. SELTZER    2,722,884
BALE TENSIONING DEVICE FOR BALING MACHINES
Original Filed April 15, 1952    2 Sheets-Sheet 1
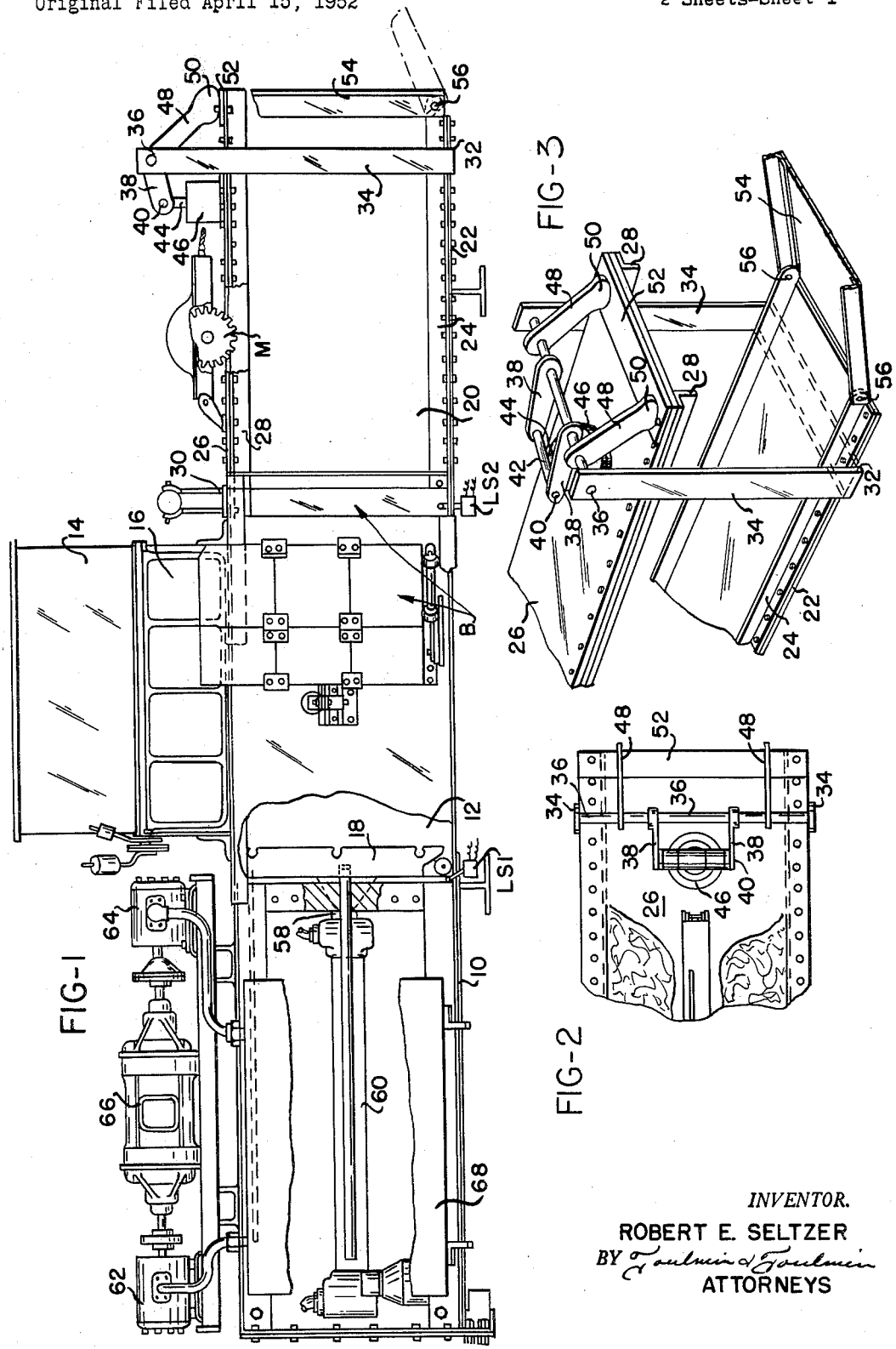
INVENTOR.
ROBERT E. SELTZER
BY
ATTORNEYS INVENTOR.
ROBERT E. SELTZER
BY Toulmin & Toulmin
ATTORNEYS

United States Patent Office 2,722,884
Patented Nov. 8, 1955

2,722,884

BALE TENSIONING DEVICE FOR BALING MACHINES

Robert E. Seltzer, Bellevue, Ohio, assignor to The American Baler Company, Bellevue, Ohio, a corporation of Ohio Original application April 15, 1952, Serial No. 282,429. Divided and this application April 14, 1953, Serial No. 348,777

3 Claims. (Cl. 100—192)

This application relates to a baling machine, and in particular to a baling machine having an automatic bale tensioning device.

In the baling of materials, particularly industrial wastes such as paper and cloth, considerable difficulty is experienced in producing bales of uniform density. This comes about because the material being baled will vary considerably in characteristics, especially in the case of paper, because the material being baled might be in the form of loose sheets of paper or in the form of relatively solid and heavy books such as telephone books. It has been attempted to control the tension on the bale by making the bale tension directly responsive to the force exerted on the baling head, but this has not proved to be satisfactory because, under extreme conditions when the material being baled becomes very light or dense, the bale tensioning device either permits the bale to be produced under too little tension in the first place or will practically stall the machine in the second place.

Mechanical devices which will pre-set to provide for a tapering throat through which the bale is pressed as it is being made have proved unsatisfactory because no constant bale tensioning device of this nature can adapt itself to the widely varying nature of the material being baled, and, accordingly, the bales being produced in such a device exhibited non-uniform density.

Having the foregoing in mind, it is a primary object of the present invention to provide a bale tensioning device in connection with a baler, particularly for industrial wastes and the like which operates automatically to maintain the tension on the bale being formed so that the density of the bale produced is constantly within relatively close limits.

A still further object is the provision of a bale tensioning device for a hydraulically operated baler in which the bale tensioning device is hydraulically operated, but which is isolated from extremes of high and low pressure which might be encountered in the hydraulic circuit to the baling head.

Another object of the present invention is the provision of a hydraulically actuated bale tensioning device arranged so that excessive bale tensioning forces are prevented whereby the bales produced will not have spots therein of greater density than a predetermined amount.

In general, the several objectives referred to above, as well as still other objectives of this invention, are attained by arranging a baling chamber through which the bale being produced is pushed during the forming thereof, and which baling chamber has relatively movable top and bottom walls with a hydraulic ram arranged for urging the walls toward each other and connected in circuit with the source of fluid pressure that is supplied the baling head. The connection to the bale tensioning ram comprises a pressure limiting valve, an accumulator, and a pressure relief valve to relieve excessive pressures.

This application is a division of my co-pending application Serial No. 282,429, filed April 15, 1952.

This invention will be more fully understood upon reference to the accompanying drawings, wherein:

Figure 1 is a side view of an automatic baling machine which is hydraulically operated and which includes an automatic bale tensioning device, according to my invention;

Figure 2 is a plan view over the discharge end of the baling chamber showing the arrangement of the bale tensioning device;

Figure 3 is a perspective view of the discharge end of the baling chamber; and

Figure 4:
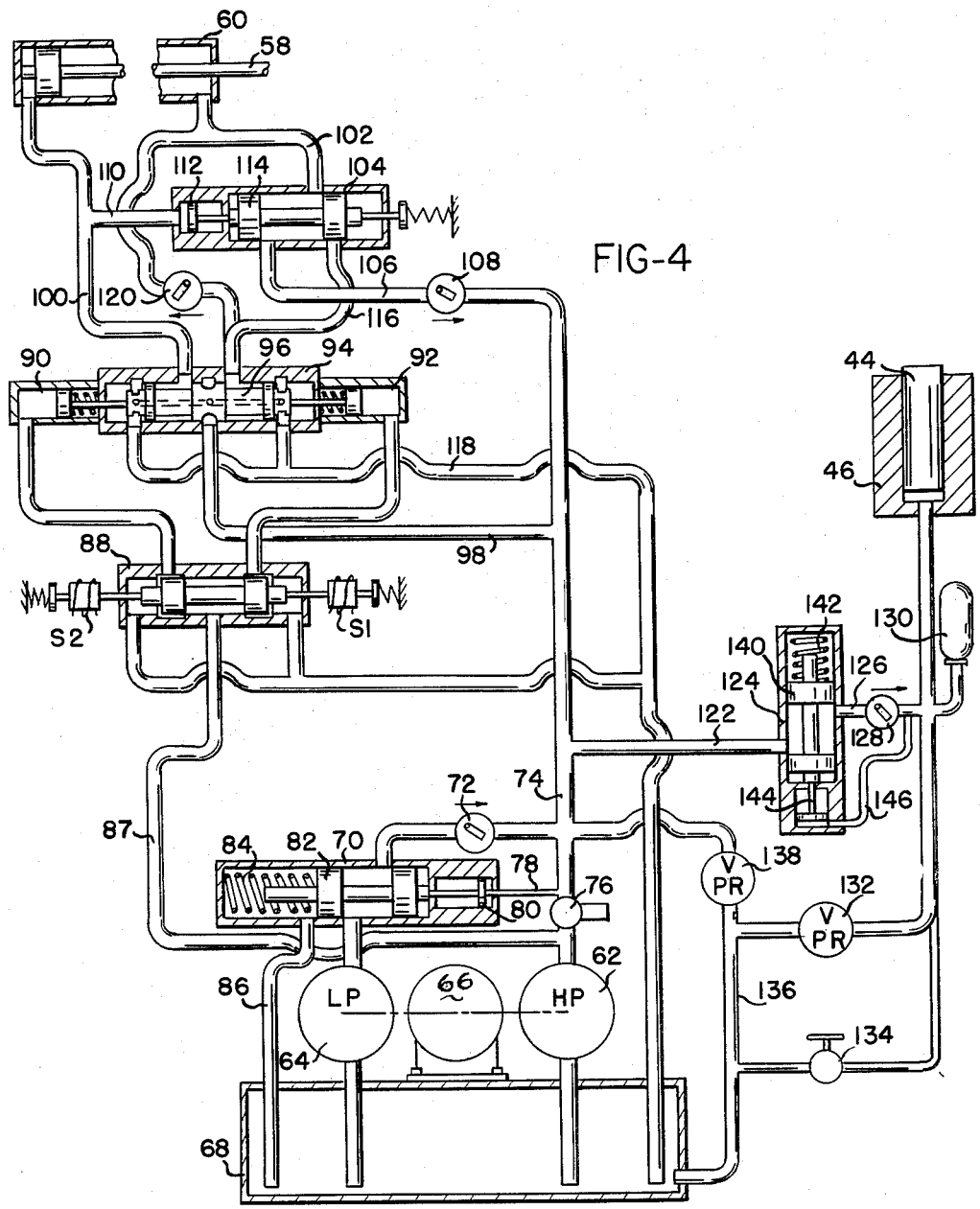
Figure 4 is a diagrammatic representation of the hydraulic actuating circuit for the baling machine and the hydraulic circuit for controlling and actuating the bale tensioning ram.

Referring to the drawings somewhat more in detail, the baling machine illustrated therein comprises a frame 10 having a compression chamber 12 in the center part thereof which is supplied with material to be compressed and baled from a hopper 14, the discharge from which may be regulated by the gates 16.

A baling head 18 is reciprocably mounted in compression chamber 12 and compresses material delivered to the said chamber and pushes it rightwardly into baling chamber 20. Baling chamber 20 comprises a bottom wall 22 forming a part of the frame 10 of the baling machine and is, accordingly, substantially stationary. At the side edges of bottom wall 22 there are provided the angles 24. The baling chamber is also provided with a plate 26 forming a top wall therefor and along the side edges of which are arranged the angles 28. The top wall of the baling chamber is supported in cantilever fashion from point 30 of frame 10 of the machine which is at the right end of compression chamber 12. The upper wall of the baling chamber is thus movable toward and away from the lower wall thereof in a predetermined amount.

Extending transversely across and beneath a point adjacent the right end of the bottom wall is a structural member 32, to the ends of which are attached the upstanding bars 34 arranged at opposite sides of the baling chamber and extending upwardly to a substantial distance beyond the upper wall of the baling chamber. Adjacent their upper ends the bars 34 pivotally support the transversely extending shaft 36 which has fixed thereto a first pair of arms 38 leading backwardly and pivotally receiving a cross head 40 that is connected as at 42 with the bale tensioning ram 44 reciprocably mounted in cylinder 46 that is carried by any suitable mounting means on plate 26.

Shaft 36 also carries a pair of spaced arms 48 that extend forwardly and downwardly to arcuate end portions 50 that bear on top of a transverse wear plate 52 attached to the extreme right end of plate 26.

The right or discharge end of the baling chamber is adapted for being closed by the gate 54 pivoted to the bottom wall of the baling chamber at 56.

At this point it will be appreciated that a supply of pressure to cylinder 46 that would tend to force ram 44 upwardly therein would bring about rotation of shaft 36 in a direction to move arms 48 clockwise so that there would be a downward thrust exerted on top plate 26 and an upward thrust on the bars 34 which would tend to move the top and bottom walls of the baling chamber toward each other, thus to resist the movement of a bale therethrough.

With regard to the actuation of the baling head 18, this member is mounted on a double acting ram 58 that is reciprocable in a cylinder 60 supported in the left end of the frame of the machine.

A hydraulic power unit comprising a high pressure low delivery pump 62 and a low pressure high delivery pump 64 driven by the double ended motor 66 is provided for energizing the baling head motor and the bale tensioning ram.

A reservoir 68 carried on the side of the machine provides a source of fluid for pumps 62 and 64.

Figure 4 illustrates more or less in detail the hydraulic system connecting the pumps 62 and 64 with the cylinder 60 for the baling head ram 58 and the cylinder 46 for the bale tensioning ram 44. In Figure 4 the low pressure pump 64 discharges through a valve 70 and a check valve 72 to conduit 74 forming the pressure manifold for the hydraulic system. High pressure pump 62 discharges through a resistance valve 76 to conduit 74, and a pilot conduit 78 leading to a pilot piston 80 associated with valve member 82 of valve 70 provides means for urging the said valve member 82 leftwardly against spring 84 at a predetermined pressure in conduit 74 thereby to bypass low pressure pump 64 through conduit 86 back to reservoir 68. In this manner a large supply of fluid at low pressure is available for high speed movement of the baling head when it is under light load, and a low volume high pressure supply of fluid is available for movement of the baling head at reduced speed, but under greater thrust when the baling head becomes loaded.

Resistance valve 76 maintains a predetermined minimum discharge pressure on pump 62 which is conveyed through conduit 87 to the inlet of a closed center 4-way pilot valve 88. Pilot valve 88 has its service ports connected with the pilot cylinders 90 and 92 of a 4-way reversing valve 94 that is connected with cylinder 60.

A solenoid S1 associated with valve 88 is energizable for shifting the valve to the right to bring about a supply of pressure fluid to pilot cylinder 92 whereupon valve member 96 of valve 94 will be shifted rightwardly, whereas a solenoid S2 associated with valve 88 is energizable for moving the valve member thereof leftwardly to bring about a supply of pressure fluid to pilot cylinder 90 to valve 94 to shift the valve member 96 leftwardly.

A branch conduit 98 leads from pressure manifold 74 to the inlet of valve 94, and when valve member 96 is shifted rightwardly conduit 98 is connected with conduit 100 which leads to the left end of cylinder 60 and supplies fluid thereto for advancing the ram 58 toward the right.

During the initial advancing movement of ram 58 the displacement of fluid from the right end of cylinder 60 is conducted through a conduit 102 and valve 104 to a conduit 106 and through a check valve 108 to the pressure manifold 74 where it adds to the fluid being supplied by pumps 62 and 54 thereby greatly increasing the speed of movement of ram 58.

However, when the ram encounters resistance pressure will be built up in conduit 100 and conducted therefrom through pilot conduit 110 to a pilot cylinder 112 associated with valve 104 which will move valve member 114 thereof to the right thereby disconnecting conduit 102 from conduit 106 and connecting conduit 102 instead with conduit 116 leading to valve 94 and thence back to reservoir 68 by way of exhaust manifold 118.

By arranging the valves 70 and 104 so that they shift at respectively different pressures, the ram 58 can be caused to commence its movement at high speed and then to proceed at reduced speed and increased thrust, and then, finally, to move at still further reduced speed with a maximum thrust being exerted thereon.

Upon shifting valve member 96 to reverse the supply of fluid to cylinder 60, the conduit 98 will be connected with conduit 116, but valve 104 will be bypassed by check valve 120 and the fluid will be supplied directly to the right end of cylinder 60 and be exhausted directly from the left end thereof.

A branch conduit 122 connected with pressure manifold 74 leads to the body of a pressure regulating valve 124 having a discharge conduit 126 leading through a check valve 128 to the inlet of cylinder 46 of the bale tensioning mechanism, to the inlet of a hydraulic accumulator 130, and to the inlets of a pressure reducing valve 132 and the manually operated shut-off valve 134, the outlets of the said valves being connected with reservoir 68 by way of a conduit 136 leading from the discharge side of a relief valve 138 whose inlet side is connected with pressure manifold 74.

Pressure regulating valve 124 comprises a valve member 140 normally urged by a spring 142 into position where conduits 122 and 126 are connected so that a supply of fluid will be directed to cylinder 46 and accumulator 130. When the pressure being supplied to the said cylinder and accumulator reaches a predetermined value the pilot piston 144, which is connected with the discharge side of check valve 128 by pilot conduit 146, will be effective for moving valve member 140 upwardly thus to restrict or interrupt communication between conduits 122 and 126. This has the effect of entrapping the pressure fluid in the hydraulic accumulator 130 and in cylinder 46 so that the pressure in the pressure manifold 74 can then drop without there being any reduction in the energization of the bale tensioning ram. Similarly, should the pressure rise in the pressure manifold it will be prevented from passing to the hydraulic accumulator 130 and cylinder 46. The pressure standing in cylinder 46 for energizing the tensioning ram 144 is thus substantially constant under all conditions of operation of the baling machine, and the character of the material being compressed in the baling machine as to varying densities does not contribute to non-uniformity of the bales that are produced. Rather, a substantially constant and unvarying tension is exerted on the bales, and the bales which are produced accordingly exhibit uniform density.

Inasmuch as the possibility exists that it may be necessary for the walls of the baling chamber to yield outwardly to permit the passage of certain large portions of the bale, the relief valve 132 is provided which will open at a predetermined excess pressure within cylinder 46 whereby even under extreme conditions where there must be displacement of fluid from cylinder 46 to maintain the proper bale tension, the system according to the present invention is operative.

For manually exhausting cylinder 46 for the purpose of removing a bale from the machine, or for any other purpose, the manually operated shut-off valve 134 is provided which is normally closed during operation of the baling machine.

The electric control circuit for controlling the solenoids S1 and S2 has not been shown, but it will be understood that they could be arranged in a control circuit so as to be responsive to the limit switches LS1 and LS2 indicated in Figure 1 and which are positioned to be operated by baling head 18 at the limits of its travel in opposite directions.

Similarly, the baling machine preferably comprises a banding mechanism generally indicated at B in Figure 1 and a bale measuring device M which initiates operation of the banding mechanism at a predetermined length of bale. These particular elements are more fully disclosed and described in the parent application referred to above, and form no essential part of the invention claimed in the present application.

It will be understood that this invention is susceptible to modification in order to adapt it to different usages and conditions, and, accordingly, it is desired to comprehend such modifications within this invention as may fall within the scope of the appended claims.

I claim:

1. In a baling machine; a compression chamber for receiving material to be baled, a baling head for compressing the material in the compression chamber and forcing it therethrough, a baling chamber for receiving the material from the compression chamber and having top and bottom walls, bars connected to the bottom wall and extending upwardly to above the top wall, a shaft journalled in the upper ends of the bars and extending across and above the top wall, arms on the shaft slidably engaging the end of the top wall, a hydraulic motor for rotating said shaft to move said walls relatively toward and away from each other to control the resistance to movement of a bale through said baling chamber, a hydraulic ram for actuating said baling head and a source of pressure fluid therefor, an accumulator connected with said hydraulic motor, a hydraulic connection between said source and said motor comprising a pressure regulating valve and a check valve opening toward said motor whereby a substantially constant pressure can be maintained in said motor during variations in pressure of said source, and valve means bypassing said check valve and said pressure regulating valve for relieving excess pressures in said hydraulic motor.

2. In a baling machine; an elongated chamber through which the bale being formed is pushed having top and bottom walls movable toward each other, bars connected to the bottom wall and extending up to above the top wall, a shaft journalled in the upper ends of said bars, arms on the shaft bearing on the end of the top wall, a hydraulic motor comprising a cylinder mounted on said top wall on the opposite side of said shaft from said arms and having a plunger vertically reciprocable thereon, other arms connecting said plunger with said shaft whereby a supply of pressure fluid to said cylinder will rotate said shaft in a direction to cause said walls to move relatively toward each other, hydraulically operated baling means for forcing bales through said chamber and including a pressure supply circuit having a low pressure return side, a hydraulic connection from said circuit to said cylinder including a pressure regulating valve and a check valve opening toward said cylinder, a hydraulic accumulator connected with said cylinder whereby substantially constant pressure can be maintained in said cylinder at all times; and valve means connected between said cylinder and the low pressure side of said circuit to relieve said cylinder of excess pressures.

3. In a baling machine; an elongated baling chamber through which the bale being formed is pushed having a stationary botttom wall and a top wall yieldably supported at one end and movable toward and away from the bottom wall at its other end, bars connected to the bottom wall and extending up to above the top wall at a point spaced inwardly from said other end, a shaft journalled in the upper ends of the bars, arm means on the shaft bearing on the said other end of said top wall, a hydraulic cylinder mounted on the top wall on the opposite side of the said shaft from said other end of the top wall, a plunger in said cylinder, a second arm connecting said plunger with said shaft so that a supply of pressure fluid to the cylinder will move the plunger in a direction to rotate the shaft so that the first mentioned arm means will exert a downward thrust on said top wall, hydraulic means for forcing the bale through said chamber and including a multiple pressure supply circuit having a low pressure return side, a connection from the said circuit to said cylinder comprising a pressure regulating valve and a check valve opening toward said cylinder, a hydraulic accumulator connected with said cylinder, a relief valve connected between said cylinder and the low pressure side of said circuit, and a manually operated valve also connected between said cylinder and the low pressure side of said circuit.

References Cited in the file of this patent
UNITED STATES PATENTS

| | | |
|---|---|---|
| 808,795 | White | Jan. 2, 1906 |
| 1,712,791 | Gallagher | May 14, 1929 |
| 2,352,187 | Ellinwood | June 27, 1944 |
| 2,396,720 | Nolt | Mar. 19, 1946 |
| 2,576,784 | Dodds et al. | Nov. 27, 1951 |
| 2,582,672 | Bobst | Jan. 15, 1952 |